United States Patent [19]

Klein et al.

[11] 4,225,657
[45] Sep. 30, 1980

[54] SEPARATORS FOR SECONDARY CELLS AND SIMILAR SYSTEMS

[76] Inventors: Yitzhak Klein, 1 Chatham Sofer St.; Jonathan R. Goldstein, 51 Hashachal St.; Perach Valentina, 48 Meir Nakar St.; Esther Kobliakov, 9 Breuer St., all of Jerusalem, Israel

[21] Appl. No.: 968,832

[22] Filed: Dec. 12, 1978

[30] Foreign Application Priority Data

Dec. 14, 1977 [IL] Israel ................................. 53611

[51] Int. Cl.$^3$ .......................................... H01M 2/16
[52] U.S. Cl. ................................... 429/248; 429/251
[58] Field of Search ..................... 429/251, 248, 229

[56] References Cited

U.S. PATENT DOCUMENTS

| | | |
|---|---|---|
| 1,192,889 | 8/1916 | Gray . |
| 3,466,669 | 6/1966 | Arrance et al. . |
| 3,479,266 | 11/1969 | Rajan et al. . |
| 3,516,862 | 6/1970 | Grinten ............................. 429/229 |
| 3,970,472 | 7/1976 | Steffensen . |
| 4,007,059 | 2/1977 | Witherspoon et al. .............. 429/251 |

*Primary Examiner*—Donald L. Walton

[57] ABSTRACT

The present invention relates to a separator for use in alkaline secondary zinc cells and for use in electrochemical systems where permeation of hydroxyl ions is desired and where permeation of zincate ions is to be inhibited, comprising an inert support to which there is applied a layer comprising a polymeric binder and a carbonate or hydroxycarbonate of nickel, cerium, lanthanum, magnesium or calcium, or a mixture of any of these or which comprises a self-supporting structure of such polymeric binder or matrix-forming material and such carbonate or hydroxycarbonate. There may be incorporated in such separator electrocatalysts and fillers or surface extenders. The invention also relates to the process of production of such membranes.

9 Claims, No Drawings

SEPARATORS FOR SECONDARY CELLS AND SIMILAR SYSTEMS

FIELD OF THE INVENTION

According to the present invention there are provided novel separators for use in secondary batteries of the zinc alkaline type, such as Ni-Zn, Ag-Zn, $MnO_2$-Zn, Zn-$O_2$ and Zn-air type, wherein the zinc serves as negative electrode. One of the problems of this type of secondary cell is the formation of dendrites which tend to penetrate the separator barrier between the positive and the negative electrodes and cause shorts. It is an object of the present invention to overcome this problem, and this is accomplished by the provision of a novel type of separator which constitutes an effective barrier to dendrite penetration. Such separators can also be used in other systems; they can be used as membranes in electrolysis, dialysis, osmosis and ion exchange processes.

STATE OF THE PRIOR ART

The history of separators for use in zinc secondary cells is summarized in "Alkaline Storage Batteries", Falk et al., J. Wiley & Sons, 1969. Early work concentrated on organic separators based on cellulose derivatives. These have the drawback of oxidative deterioration and lack of adequate mechanical strength. Recently ceramic separators have been suggested: U.S. Pat. No. 3,446,669 and U.S. Pat. No. 1,192,889 (1969). These are prepared by sintering materials such as $Al_2O_3$ with one of the following: $Cr_2O_3$, CoO, NiO, MgO, CaO, $Fe_2O_3$ or mixtures of silicates with zinc silicate or iron silicate. One of the drawbacks of this type of separators is their fragility and high cost of manufacture. DOS. No. 1,950,920 (Yardney Int.Corp) describes inorganic separators which are either selfsupporting or deposited on one of the electrodes, comprising a crystalline layer of an oxide or hydroxide of a transition metal or rare earth metal insoluble in the electrolyte. These separators are said to contain up to 30% of an organic polymer such as polytetrafluoroethylene (PTFE), poly ethylene or polyvinyl alcohol. The DOS points out that nickel hydroxide is not suited for certain applications as it has a tendency to undergo oxidation.

This DOS describes the precipitation in the presence of such polymers from a percursor, such as sulfate or acetate, of the oxide or hydroxide. U.S. Pat. No. 3,479,266 relates to anionic exchange membranes consisting of thorium hydrous oxide and a second hydrous oxide of an alkaline earth, actinide, lanthanide etc., together with a polymeric binder. The products of the DOS and of the said US patent are rather brittle, cannot be folded without danger of cracking and often undergo swelling or warping in battery electrolytes.

U.S. Pat. No. 3,970,472 (Steffensen assigned to McGraw-Edison Co., 1976) describes a multi-layer separator for Ni-secondary batteries, comprising conventional microporous or cellulosic layers enclosing a separate backup zinc dendrite barrier layer, the barrier layer itself comprising a porous flexible layer such as polypropylene in which is deposited a porous metal having a low hydrogen evolution overpotential, said barrier layer oxidizing zinc dendrites on contact in alkaline solution, allowing free flow of ions and escape of evolved hydrogen, and preventing any dendrites from passing through and penetrating the outer separator layers.

The conventional microporous or cellulosic outer separator layers, with their poor selectivity for hydroxide ions over zincate ions cannot prevent massive concerted penetration of zinc dendrites at many points of the barrier layer, particularly with rapid charge rates and at depths bf discharge in the 60-90% range. In such cases the barrier layer cannot cope with the rate of arrival of zinc, and massive shorting results, the situation being aggravated by the excellent conductivity of the barrier layer since it is a metallic continuum. Similar considerations apply to U.S. Pat. No. 4,039,729 in which the barrier layer is provided with a current carrying lead and it is sandwiched between conventional separator materials, this system also having the drawback of a lag-time after discharge (in which the cell cannot be used), during which inconvenient lag time the barrier layer must be shorted out to the negative zinc electrode in the cell to remove dendrites.

No overlap with the prior art patents U.S. Pat. Nos. 3,970,472 and 4,039,729 can be envisaged. According to the present invention the hydroxycarbonate layer with its high selectivity for hydroxide over zincate ions effectively prevents concerted penetration of zinc dendrites in massive form, but even more important preferably an electrocatalyst is present within the layer to dissolve any zinc that does enter. Furthermore, the fact that such electrocatalyst is present in the form of a non-continuous particulate component, being insulated electrically by particles of binder and hydroxy carbonate, acts against the possibility of massive shorting. The choice of electrocatalyst is also important. Iron carbide can operate reversibly even in a non-gassing mode not involving $H_2$ evolution to dissolve the zinc dendrite i.e. as a flooded oxygen reduction electrode, and of course to remain fully active the electrocatalyst must remain resistant to zinc deposition from solution.

SUMMARY OF THE INVENTION

The present invention relates to novel separators for use in alkaline zinc secondary cells and for similar applications, which constitute an effective barrier to dendrite penetration. According to a preferred embodiment a backup system is provided within the separator in the form of a suitable electrocatalyst adapted to decompose zinc dendrites when these attempt to penetrate the separator. The novel separators further result in an improved morphology of the zinc layer deposited during charging on the electrode adjacent said separator. The novel separators have a low electrical resistivity; they permit practically free passage of hydroxyl ions while inhibiting passage of zincate ions. Additional constituents, such as fillers, additives adapted to improve zinc morphology during charging and/or electrocatalysts may be incorporated in the separator.

The novel separators are produced by applying a water-insoluble inorganic substance generally a carbonate or hydroxycarbonate, termed "Precursor," together with a polymeric binder to a porous support suitably drying and exposing same to an electrolyte of the type used in such secondary cells, to produce a flexible composite separator structure. The exposure to the electrolyte results in chemical and physical changes: a suitable product of a gel-like nature is obtained resulting in excellent physical stability and uniformity, even of thin layers containing small quantities of binder. The product is characterized by good anion selectivity, thus permitting hydroxyl ions to pass practically unhindered, while zincate ion transfer is inhibited.

During processing in the electrolyte the precursor undergoes a gel-forming reaction resulting in a locking-in effect of the gel-like product-binder mixture giving a product of excellent physical properties, which is practically devoid of pinholes and which can be folded without cracking.

Various precursors may be used: the resulting product must be stable in the electrolyte to which it is subsequently exposed. Both precursor and product are substantially water-insoluble and advantageously the product is of lower density than the precursor.

A typical example of suitable precursor is basic nickle carbonate also known as zaratite, of the approximate formula $NiCO_3.2Ni(OH)_2 4H_2O$ which is converted upon reaction with potassium hydroxide solution to a gel-like state [probably a partially hydrolysed product richer in the nickel hydroxide $Ni(OH)_2$ component] and which has the required properties for the intended uses. Other suitable carbonates are, for example other basic nickel carbonates such as $2NiCO_3.3Ni(OH)_2.4H_2O$; cerium carbonate $Ce_2(CO_3)_3.5H_2O$; $La_2(CO_3)_3.8H_2O$; $MgCO_3.5H_2O$; $MgCO_3.Mg(OH)_2.3H_2O$, artinite; and $CaCO_3.6H_2O$; these give when treated with aqueous potassium hydroxide gel-like hydroxyl-conducting products, of which the calcium carbonate gives the least stable product and which is not quite suitable for the intended purposes. As byproduct there is formed potassium carbonate and as this is an undesired component, the processing liquid is generally discarded. There is first produced an intimate mixture of polymeric binder and precursor, if desired with certain additive or additives, such as electrocatalyst, and when this is reacted with potassium hydroxide solution the resulting gel formation and expansion causes a locking in effect of the inert polymeric binder and support structure giving a robust product with the desired ion-selective properties. Suitable electrocatalysts having the required chemical stability in the system which have a low overvoltage for hydrogen evolution and which resist electrodeposition of metallic zinc are, for example, iron carbide, nickel boride and mixed oxides of the spinel type or similar structure which contain cobalt. These promote the dissolution of zinc dendrites with liberation of hydrogen, according to:$Zn + 2OH^- \rightarrow ZnO_2^{2-} + H_2$. An alternative mechanism for the operation of these electrocatalysts is a non-gassing mode since these materials can reversibly take up oxygen which is freely evolved from the positive electrode during charge, and dissolve zinc and dendrites according to the reaction $$2Zn + O_2 + 4OH^- \rightarrow 2ZnO_2^{2-} + 2H_2O.$$

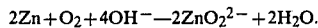

The efficacy of the electrocatalyst is further enhanced by incorporation of a high surface area conducting extender adapted to act as a supplementary site for hydrogen evolution, such as for example carbonyl nickel powder. Amongst the additives there may be mentioned additives providing ions which are beneficial to the zinc charging process, such as emulphogene or zinc plumbate. A further optional additive is of the type of void fillers offsetting too-large expansion changes of the precursor. $MgCO_3$ densifies on exposure to KOH to give $Mg(OH)_2$.

Amongst polymeric binders, insoluble in the electrolyte of the system where the separators are to be used there may be mentioned PTFE in emulsion or powder form, polyvinyl alcohol etc. Suitable support materials are, for example microporous polypropylene which is robust and has very favorable mechanical properties; there may also be used porous rubber, polyvinyl chloride, non-woven polyamide sheets, asbestos or the like.

The separators are produced by applying the gel precursor and polymeric binder, if desired with backup material and/or extender and/or void filler, in intimate mixture, to a suitable sheet-formed support, by any conventional coating technique such as painting, dipping, spraying, rolling etc. The thus obtained coated support is generally subjected to curing to coagulate, stabilize and dry the coating. The product may be stored until required, and it is subsequently treated in aqueous potassium hydroxide solution, of about battery strength, for about 1-24 hours. The coating mixture is generally suspended in a suitable liquid vehicle and adjusted to suitable viscosity for the coating technique used. According to a preferred embodiment the coating is sandwiched between two sheets of support material which can be folded, edge bonded or heat-sealed to eliminate contact between the active layer and the electrode elements. According to yet a further embodiment the coating may be applied on the inner bag of a double bag structure, enclosing one of the electrode elements.

The separator can be assembled in its semi-final state in a battery stack or similar arrangement, and subsequently treated with the aqueous potassium hydroxide solution. The polymeric binder can be used in ratios of as low as 5 to 20 weight percent calculated on the coating mixture. Typical support materials are of 0.1 mm to 0.5 mm thickness and about 0.2 g to 1 $g/dm^2$ weight (for a double layer), and the thickness is increased by the active layer by about 0.05 mm to 0.4 mm and weight by 0.2 g to 5 $g/dm^2$. The separators according to the present invention are characterized by excellent properties: they effectively inhibit dendrite formation, promote formation of satisfactory morphology zinc layers on the surface adjacent the separator during charging and have excellent ion-selective properties. It ought to be stressed that the separators are rugged, essentially pinhole free and they can be folded, heat-sealed or prepared in envelope form. Ionic resistance is low, of the order of 5 to 50 ohm cm in 40 wt-% aqueous KOH at 25° C. Mechanical properties are excellent and do not deteriorate during prolonged use: the coating does not crack or warp and no delamination takes place during repeated charge/discharge cycles.

It is imperative that the electrocatalyst, when present in the separator, ought to remain firmly bonded therein as even a small quantity thereof is likely to seriously adversely affect the characteristics of the cell if released into the electrolyte. Separators produced as set out above firmly lock in the various constituents and no catalyst is released into the electrolyte.

The novel separators are of wide applicability: they can be used in the various types of alkaline cells having zinc electrodes. They are also of use in other processes such as electrolysis, electrophoresis, dialysis, osmosis and ion exchange. The following examples illustrate the invention and some of its applications, but these are to be construed in a non-limitative manner.

The quantities are chosen in such manner that the weight of the final coating is about 0.2 to 5 $g/dm^2$. Typical weight ratios are: precursor: 30 to 90%; electrocatalyst: 1 to 20%; extender 5 to 60%; polymeric binder 5 to 30% calculated on solid content if a dispersion or emulsion is used. Parameters to be considered are surface area, apparent volume and volume changes. Advantageous results were obtained with similar apparent volumes of electrocatalyst and extender, while the apparent volume of precursor ought to be about 3–15 times that of the combined volume of electrocatalyst and extender. The above are indicative data and for certain applications and techniques a different ratio may be of advantages.

According to a further embodiment of the present invention, the separator is produced by forming a self-supporting sheet, starting with a suitable binder or matrix-forming material, such as polytetrafluoroethylene (PTFE), polyvinylidene fluoride, polyethylene, polypropylene, silicon based polymers, polyvinyl acetate (PVA) and the like in powder or other form and with the compounds defined herein as "precursors," namely the various carbonates and hydroxy carbonates of nickel, cerium, lanthanum, magnesium, calcium and mixtures of any of these, and forming these into a suitable sheet by conventional means, such as rolling, casting, extruding or the like, and subsequently subjecting the resulting sheet to the action of an aqueous solution of an alkali metal hydroxide, converting said carbonate or hydroxy-carbonate to a gel-like product which is obtained in the form of a firm entity locked in the matrix of the polymeric substance. Such self-supporting sheets are advantageously formed from mixtures into which there are incorporated the other constituents mentioned herein, such as electrocatalysts adapted to prevent dendrite penetration, surface area extenders or related electrocatalysts, void fillers and the like. Separators of this type were prepared and tested and the results obtained were similar to those obtained with separators based on the use of porous supports illustrated in the various examples. The polymeric binder generally constitutes from about 10 to 50 percent by weight of the separator, the preferred range being about 25 to 50 percent by weight. The dry separator sheets are advantageously of a thickness of from about 0.25 mm to about 0.8 mm, and these swell to a certain extent after the reaction in the alkali metal hydroxide solution.

EXAMPLE I:

Separator based on basic nickel carbonate

A quantity of 6 g of commercial grade basic nickel carbonate ($NiCO_3.2Ni(OH)_2.4H_2O$, apparent density: d=0.3 g/ml), 4.5 g carbonyl nickel, battery grade, d=1.5 g/ml and 1.5 g iron carbide $Fe_3C$(prepared by reduction of magnetite and carbon black at a weight ratio of 6.4 to 1 at 900° C. for 1 hour, d=0.5 g/ml) was finely ground and to this there was added 4 ml of a PTFE emulsion of 54% solid content, and 20 ml water. The thus obtained paste was heated on a hot plate with stirring until a paint-like viscosity was obtained. The viscous paste was applied to a laminated microporous polypropylene sheet of 0.8 mm thickness and 0.3 g/dm$^2$ weight with one matte and the other—a smooth side. The electrodes of the cell were 15×7 cm and thus a support sheet of 16×32 cm was used allowing for folding, heat-sealing and excess size over that of the electrodes. A rectangle of 7.5×31 cm was coated uniformly (half the matte surface) leaving a perimeter for sealing. The sheet was dried at 70° C. during 1 hour, to constant weight, and a uniform grey film was obtained. The sheet was folded widthwise and its edges were heat-sealed. There was obtained a dry and robust separator sheet of 32×8 cm of 0.4 mm thickness and 7 g weight. It could be folded lengthwise to enclose one of the electrodes in the cell.

The sheet was immersed in 40% by weight aqueous potassium hydroxide and left for 1 hour at ambient temperature, converting the precursor to the gel-like state. The separator was washed and equilibrated with 31 wt-% KOH at 25° C., its resistance was 26 ohm cm and the thickness remained 0.4 mm.

In order to test the anion selective properties of the separator, it was used as partition in a two-compartment cell, one containing 31 wt-% KOH saturated with zincate, the other containing 31 wt-% KOH. A nickel foil anode was placed in the zincate compartment, whilst the cathode was a steel foil placed in the other compartment. Electrolysis was carried out at a current density of 1A/dm$^2$. After electrolysis for six hours, no zinc was plated out on the steel foil, which gassed hydrogen only. analysis after this period showed the zincate concentration in the originally zincate-free compartment to have risen from zero to only 0.05 M/l, whereas it was 0.8 M/l in the other compartment. This demonstrates the selective ion exchange properties of the separator, free passage of hydroxide ions while restricting transfer of zincate ions. The experiment was repeated with the microporous polypropylene substrate alone. Zinc commenced plating out onto the steel foil within a few minutes and the zincate concentration rose to saturation level (0.8 M/l) after a few hours.

EXAMPLE 2

Comparative test of the Separator of Example 1

A Ni-Zn cell was constructed from 3 negative 15×7 cm zinc electrodes, 1 mm thick of the teflonized zinc oxide type, and 2 positive sintered nickel electrodes of the same dimensions positioned between these. These were spaced 0.4 mm apart and each positive electrode was inserted into a folded separator prepared according to Example 1. The cell was positive limiting the net capacity of the positives being 5AH (considering the 4A discharge rate) whilst enough zinc oxide was present for 18 AH theoretically, in order to offset shape change buildup; the electrolyte was 31 wt-% KOH containing 1 wt % LiOH, and 50 ml electrolyte was required to fill the cell. Accelerated testing with high rate charging and deep discharging was vital as a means of examining for separate failure.

The cell was charged with a constant current of 1.5A for 4 hours and discharged at 3.5A to an end voltage of 1.4V. After the first cycle the electrolyte was replaced in order to remove carbonates from the separator processing stage. By cycle five the cell had reached its nominal capacity of 5 AH with average discharge voltage of 1.6V. Since the cell weight was 135 gm the energy density was 60 WH/kg, the separator weight was about 2 gm/AH. The cell capacity remained close to 5 AH for the first 200 cycles, but by cycle 350 had dropped to 3 AH through shape change effects. The cell showed no problems due to dendritic shorts.

In order to demonstrate the great stability of the separator, after every 50 cycles, the cell was overcharged for 10 hours at the very high rate of 2.5A (2 hour rate). Although the cell capacity only increased marginally and there was excessive water loss from the cell during the overcharge period, the separator successfully withstood penetration by zinc dendrites. A final experiment was carried out to indicate the possible long cycle life capabilities of the separator barring shape change effects in the cell. The three negatives and the remaining electrolyte was replaced with new ones after cycle 350 and the cell was reassembled. The original capacity of the cell (5AH) was again observed for a further 200 cycles before shape change effects intervened, and the separator again withstood 10 hours overcharge at the 2 hour rate with no failure due to dendrites at the end of this period.

Post mortem of the cell showed the separator to be still in good condition with the painted coating free of pinholes and zinc growths.

Cell assembly and cycling was repeated with a separator consisting of microporous polypropylene along. Dendritic shorts resulted after 5 cycles. Using a conventional cellulose separator in three layers delayed the formation of shorts up to 40 cycles. It was important to demonstrate the use of the precursor component compared with the use of non-gel forming materials (e.g. nickel hydroxide) in order to stabilize the thin, low-binder content layer. A sample of $Ni(OH)_2$ with the same apparent volume as basic nickel carbonate was substituted for the latter in Example 1. The separator was tested as above and was punctured by dendrites after only 30 cycles. Post morten of the cell showed that some delamination of the coating had occured (th layer did not adhere to the polypropylene) and that shorts had also occured round the edges of the separator. This would accord with the very high separator resistance (100 ohm cm) with this $Ni(OH)_2$ starting material.

Aggresive cycling tests as above demonstrate importance of incorporating the electrocatalyst iron carbide and the extender carbonyl Ni. In cells with separators incorporating basic nickel carbonate alone no dendritic failure occured after cycle 100 at normal cycling rates and with minimal overcharging. Addition of either the carbide or Ni was advantageous against dendrite failure on overcharge, but the overwhelmingly successful combination was that of all three components. Self-discharge tests with and without the electrocatalyst component in fully charged cells indicated the same low self discharge rate (1% of the total capacity per day) indicating that the incorporation of electrocatalyst into the separator does not introduce stability problems.

EXAMPLE 3

SEPARATOR BASED ON BASIC NICKEL CARBONATE/CARBON BLACK/CARBONYL NICKEL SUPPORTED MICROPOROUS POLYPROPYLENE SUBSTRATE

The weights and components for the separator were the same as in Example 1, but in place of iron carbide electrocatalyst a conducting carbon black of high surfaces area was used. The apparent density of the black (0.1 gm/ml) was much smaller than that of the carbide (0.5 gm/ml). Thus only 0.3 gm carbon black was used in order that the apparent volume of carbon black and carbonyl nickel be equal. The percentages by weight were nickel carbonate (46%), carbon black (2%), nickel (35%) and PTEE (17%). The paste for painting was prepared as previously described, but was applied over the whole of the matte surface in a number of layers, each one being allowed to dry somewhat before the next one was applied. The separator was then dried to constant weight (70° C.). After folding and heat sealing the separator dimensions were 32×8 cm thickness 0.3 mm and weight 4 g. The resistance in 31 wt KOH at 25° C. following processing was 35 ohm cm.

Two separators prepared in this way were incorporated into a Ni-Zn cell of nominal capacity 5 AH fabricated and cycled as described in Example 2. The cell capacity remained at 5 AH for the first 200 cycles whereupon shape change degradation effects set in, but were no dendritic problems even on prolonged high rate cell overcharge.

EXAMPLE 4

SEPARATOR BASED ON CALCIUM CARBONATE HEXAHYDRATE/COBALT-NICKEL SPINEL OXIDE/CARBONYL NICKEL ON A POROUS POLYAMIDE SUPPORT

The components for the separator were precursor $CaCO_3.6H_2O$ 4 gm (apparent density 0.2 gm/ml), electrocatalyst cobalt-nickel spinel oxide $Co_1Ni_2O_4$ 1.5 gm, extender carbonyl Ni 4.5 gm as used in Example 1. Teflon emuision 3.1 ml and water 15 ml. The electrocatalyst powder was prepared by co-precipitation of cobalt and nickel oxalates (with Co:Ni molar ratio 1:2), followed by pyrolysis in air at 400° C. for 1 hour, as described by Tseung and Goldstein (Journal of Materials Science, 7, 1383 (1972) for the related cobalt-iron spinel oxides. The electrocatalyst apparent density (0.4 ml/gm) was close to that of the iron carbide used in Example 1. The fractions by weight were precursor (34%), electrocatalyst (13%) extender (39%) and binder (14%); the apparent volumes of electrocatalyst and extender were similar and the ratio [apparent volume precursor: (apparent volume electrocatalyst and extender combined)] was 3:1.

The separator was produced in Example 3 but a porous polyamide sheet was used (weight 0.3 gm/dm$^2$, thickness, 0.1 mm) instead of the polypropylene support. For dimensions of separator, 32×8×0.03 cm the weight was 6 g, and the resistivity after processing and equilibration in 31 mt % KOH at 25° C. was 24 ohm cm. Such separators with the coating carried on the inner bag of a double polyamide bag enclosing the positive were incorporated into a Ni-Zn cell and cycled as described in Example 2. The nominal capacity of 5 AH was achieved and maintained for the first 100 cycles, whereupon shape change effects caused a distinct drop in the capacity. There was evidence on post mortem of dendritic growths and some delamination of the painted layer. The rather poor performance of this separator compared with the nickel analogue is attributed to the formation of voids in the separator due to the small but finite solubility of the precursor hydrolysis product (prob. mainly $Ca(OH)_2$) in the battery electrolyte. A separator was produced incorporating magnesium carbonate $MgCO_3$ as void filler in place of part of the calcium carbonate. $MgCO_3$ on processing densifies to form the insoluble cement-like hydroxide product $Mg(OH)_2$. The $MgCO_3$ had an apparent density of 0.6 gm/ml, and replaced 25% by weight (1 gm) of the calcium compound. The separator, incorporated and tested in a Ni-Zn cell of the type described in Example 2 gave 200 dendrite-free cycles at close to 5 AH before shape change degradation, demonstrating the efficacy of $MgCO_3$ as void filler and cementing agent. Self discharge was low (1% of total capacity per day) demonstrating the stability of the electrocatalyst in the separator.

An experiment was carried out to demonstrate the suitability of the separator system for incorporation therein of battery additives. To the separator illustrated above ($CaCO_3.6H_2O/MgCO_3/Co_1Ni_2O_4$/Ni/porous polyamide) 1% by weight of an inorganic battery additive was added to the original separator paste. The additive was a conventional sparingly soluble lead compound which maintained in the electrolyte $10^{-4}M/l$ $Pb^{2+}$ ions, this concentration ensuring a good morphology Zn deposition on the negative electrode on charge. A Ni-Zn cell with this doped separator produced and tested as described in Example 2 achieved 300 cycles at 80% initial capcity before the onset of shape change.

EXAMPLE 5

SEPARATOR BASED ON CERIUM CARBONATE/IRON CARBIDE/CARBONYL NICKEL, ON A MICROPOROUS POLYPROPYLENE SUBSTRATE

The components for the separator were the presursor cerium carbonate $Ce_2(CO_3)_3$ $5H_2O$, 3 g (commercial grade, apparent density 0.45 gm/ml), electrocatalyst iron carbide 0.5 gm (apparent density 0.5 gm/ml, PTFE emulsion 1 ml, and water 10 ml). The proportions by weight were precursor (54%), electrocatalyst (9%), extender (27%) and PTFE (10%), whilst the proportions by volume were (electrocatalyst: extender) about 1:1 an [precursor:(electrocatalyst+extender)] about 3:1, as required. The paste for painting was prepared and applied as described in Example 3 but the weights were appropriate for a smaller microporous polypropylene sheet, one of dimensions $11 \times 18$ cm (2 dm$^2$). After folding and heat sealing the separator dimensions were $6 \times 18$ cm, thickness 0.2 mm and weight 0.8 g. The resistance in 31 wt-% KOH after processing was 15 ohm cm.

A Ag-Zn cell was constructed from two negative zinc electrodes of the teflonized zinc oxide type (1 mm thickness), sandwiching one positive silver electrode of the pasted silver oxide type (0.5 mm thickness). The positive plate capacity was 1 AH, that of the negatives 1½ AH (considering the 1 H discharge rate). Plate dimensions were 8 cm $\times$ 5 cm. The positive was enclosed in a cerium-based separator of the type defined above and was spaced 0.2 mm from each negative. The electrolyte consisted of 40 wt-% KOH and a quantity of 8 ml was required to fill the cell. The cell was given a drastic duty cycle; it was charged with a constant current of 1.3 A for 1 H and discharged at 1 A to an end voltage of 1.3 V. After the first cycle the electrolyte was replaced in order to remove carbonates from the separator processing stage. By cycle 4 the cell had reached its nominal capacity of 1 AH (positive limiting) with average discharge voltage 1.5 V. Since the cell weight was 17 gm the energy density was 90 WH/Kg; the separator weight was about 0.8 gm/AH. After 100 cycles about 75% of the original capacity remained; this was due to shape change degradation, there being no evidence of dendritic zinc growths on cell disassembly.

We claim:

1. A separator for use in alkaline secondary zinc cells and for use in electrochemical systems where permeation of hydroxyl ions is desired and where permeation of zincate ions is to be prevented, comprising an inert porous support sheet to which there is applied a layer comprising a polymeric binder and a compound selected from the group consisting of carbonates and hydroxy-carbonates of nickel, cerium, lanthanum, and mixtures thereof..

2. A separator for use in alkaline secondary zinc cells and for use in electrochemical systems where permeation of hydroxyl ions is desired and where permeation of zincate ions is to be prevented, comprising a selfsupporting sheet of an inert polymeric binder and a compound selected from the group consisting of carbonates and hydroxy-carbonates of nickel, cerium, lanthanum, and mixtures of thereof.

3. A separator according to claim 1, further conprising a surface area extender.

4. A separator according to claim 1 wherein the inert support is an inert material selected from the group consisting of porous polypropylene, porous rubber, porous polyvinylchloride, non-woven fabric and asbestos.

5. A separator according to claim 1 or 2, wherein the polymeric binder is selected from the group consisting of suspensions, emulsions and powders of PTFE, polyethylene, polypropylene and PVA.

6. A separator according to claim 1, having a flexible structure and a resistance of 5 to 50 ohm cm in 40 w-% aqueous potassium hydroxide.

7. A separator according to claim 1, wherein the compound is selected from the group consisting of basic nickel carbonate $2NiCO_3.3Ni(OH)_2.4H_2O$; Zaratite $NiCO_3.2Ni(OH)_2.4H_2O$ and nickel carbonate $NiCO_3$.

8. A separator for use in alkaline secondary zinc cells and for use in electrochemical systems where permeation of hydroxyl ions is desired and where permeation of zincate ions is to be prevented, comprising an inert porous support sheet to which there is applied a layer comprising a polymeric binder and a compound selected from the group consisting of carbonates and hydroxy-carbonates of nickel, cerium, lathanum, magnesium, and mixtures thereof and further comprising from 1 to 20 weight percent of an electrocatalyst.

9. A separator of claim 8, wherein the electrocatalyst is ion carbide.

* * * * *